United States Patent
Ogawa

(10) Patent No.: US 6,891,142 B2
(45) Date of Patent: May 10, 2005

(54) PHOTOELECTRIC SENSOR UNIT INCLUDING AUTOMATIC CONTROL CIRCUIT FOR REDUCING FLUCTUATION IN LIGHT EMISSION

(75) Inventor: Yuji Ogawa, Osaka (JP)

(73) Assignee: Keyence Corporation, Osaka (JP)

(*) Notice: Subject to any disclaimer, the term of this patent is extended or adjusted under 35 U.S.C. 154(b) by 61 days.

(21) Appl. No.: 10/340,363

(22) Filed: Jan. 10, 2003

(65) Prior Publication Data

US 2003/0136895 A1 Jul. 24, 2003

(30) Foreign Application Priority Data

Jan. 15, 2002 (JP) .................................... P.2002-006799
Aug. 1, 2002 (JP) .................................... P.2002-224785

(51) Int. Cl.[7] ................................................ G01J 1/32
(52) U.S. Cl. ............................. 250/205; 250/214 AG
(58) Field of Search ............................ 250/205, 214 A, 250/214 AG, 214 C, 214 DC, 559.4, 238

(56) References Cited

U.S. PATENT DOCUMENTS 4,998,043 A * 3/1991 Unami et al. ............... 315/151
5,008,718 A 4/1991 Fletcher et al. ............... 357/17
5,026,978 A * 6/1991 Misumi et al. ............. 250/205
5,635,733 A 6/1997 Okagawa et al. ............. 257/94

FOREIGN PATENT DOCUMENTS

| JP | 8-228022 | 9/1996 |
| JP | 9-329670 | 12/1997 |
| JP | 11-87769 | 3/1999 |

* cited by examiner

Primary Examiner—Thanh X. Luu
Assistant Examiner—Seung C. Sohn
(74) Attorney, Agent, or Firm—Kilyk & Bowersox, P.L.L.C.

(57) ABSTRACT

A photoelectric sensor unit comprises a light emitting section for emitting light to a detection area, a light receiving section for receiving light from the detection area, and a signal processing section for amplifying and processing an electric signal corresponding to the light reception amount output from the light receiving section. A four-element, high-brightness type LED is used as a light emitting element forming a part of the light emitting section and a drive circuit comprises an automatic control circuit for reducing fluctuation in the light emission amount relative to change in the ambient temperature of the LED.

21 Claims, 6 Drawing Sheets

(BAR GRAPH DISPLAY)   (DECIMAL NUMBER DISPLAY)

(FIVE-DIGIT DECIMAL NUMBER DISPLAY)

PHOTOELECTRIC SENSOR UNIT INCLUDING AUTOMATIC CONTROL CIRCUIT FOR REDUCING FLUCTUATION IN LIGHT EMISSION

BACKGROUND OF THE INVENTION

1. Field of the Invention

This invention relates to a photoelectric sensor unit comprising a light emitting section for emitting light to a detection area, a light receiving section for receiving light from the detection area, and a signal processing section for amplifying an electric signal corresponding to the light reception amount output from the light receiving section and processing the signal.

2. Description of the Related Art

As one kind of such a photoelectric sensor unit, a sensor for detecting the presence or absence of an object to be detected in a detection area (also called a photoelectric switch) is available. A reflection-type photoelectric sensor unit detects the presence or absence of an object to be detected as light emitted from a light emitting section to a detection area is reflected on the object to be detected and is incident on a light receiving section. A transmission-type photoelectric sensor unit detects the presence or absence of an object to be detected as light emitted from a light emitting section to a detection area is blocked by the object to be detected and is not made incident on a light receiving section. Not only the photoelectric sensor units (photoelectric switches), but also a unit for detecting the shape, color, displacement, etc., of an object to be detected in a detection area by light may be called photoelectric sensor unit.

A light emitting diode (LED) is often used as a light emitting element (light source) forming a light emitting section of a photoelectric sensor unit as described above. In the related art, an LED having pn junction of a semiconductor consisting of AlGaAs (aluminum, gallium, arsenic) has been used. In the description that follows, this LED is called three-element-type LED (or simply, three-element LED).

The three-element LED has the feature of being capable of providing high brightness, but has the drawback of large life degradation. Particularly, when the LED is used in a high-humidity environment, degradation caused by oxidation of Al is large and as the LED is used for a long time, reducing of the light emission amount (brightness) is observed noticeably. Therefore, to ensure the given life of the LED, it is necessary to compensate for reducing of the brightness by a drive circuit.

That is, since the brightness of the LED becomes higher as the drive current is increased in a predetermined area, if the brightness is reduced because of life degradation, the drive current can be increased for compensating for reducing of the brightness so as to maintain constant brightness. A circuit using a monitor light receiving element for detecting the brightness of an LED and controlling the drive current of the LED so that the brightness becomes constant is called an APC (automatic output control) circuit.

A photoelectric sensor unit using an LED having pn junction of a semiconductor consisting of AlGaInP (aluminum, gallium, indium, phosphorus) as a light emitting element forming a light emitting section is also commercially practical. In the description that follows, this LED is called four-element-type LED (or simply, four-element LED).

The four-element LED is characterized by the fact that life degradation caused by oxidation of Al is small and if the LED is used for a long time, the brightness is scarcely reduced because the percent age of Al can be made small. On the contrary, the measurement result indicating that the brightness slightly rises as the LED is used for a long time is obtained. Therefore, it is found that the photoelectric sensor unit using the four-element LED does not involve a problem on practical use if an APC circuit as mentioned above is omitted.

However, the four-element LED has the drawback of low brightness as compared with the three-element LED. Thus, to provide equal brightness (light emission amount) to the three-element LED, the drive current needs to be increased. For example, a drive current of about 500 to 600 mA needs to be made to flow for the four-element LED to provide brightness as much as brightness provided when a 200-mA drive current is made to flow into the three-element LED.

To make a larger drive current flow into the LED, the current capacity of the drive circuit needs to be increased, leading to an increase in the cost of the drive circuit. Since heat generation of the drive circuit and the LED is also increased, a structure (and space) for heat radiation becomes necessary; this can become an obstacle to miniaturization of the whole unit.

In a photoelectric sensor unit using an optical fiber, to avoid the adverse effect of heat generation of an LED on the base end part of the optical fiber, a structure becomes necessary for keeping a distance between the LED and the base end part of the optical fiber and placing a condensing lens therebetween. Such a structure can also become an obstacle to miniaturization of the whole unit and a decrease in the cost.

SUMMARY OF THE INVENTION

It is therefore an object of the invention to provide a photoelectric sensor unit for making it possible to miniaturize a drive circuit, and miniaturize the whole unit and decrease the cost of the whole unit while making the most of the feature of a four-element LED with small life degradation.

The inventor et al. knew the presence of a four-element, high-brightness type LED using pn junction of a semiconductor consisting of AlGaInP and comprising an optically transparent layer or a layer having a high light reflection factor replacing a substrate of GaAs (for example, refer to U.S. Pat. No. 5,008,718) and examined use of the LED for a photoelectric sensor unit.

This LED can provide equal brightness by almost the same drive current as that of a three-element LED in the related art. However, it was found that fluctuation in the brightness relative to the ambient temperature is large as compared with the three-element LED. It was found out that an automatic control circuit similar to an APC circuit placed in a photoelectric sensor unit using the three-element LED in the related art is provided, whereby fluctuation in the brightness relative to the ambient temperature can be reduced and performance with no problem on use can be provided.

That is, according to the invention, there is provided a photoelectric sensor unit comprising:

a light emitting section for emitting light to a detection area, the light emitting section including a light emitting element having a four-element, high-brightness type LED;

a light receiving section for receiving light from the detection area;

a signal processing section for amplifying and processing an electric signal corresponding to a light reception amount output from the light receiving section; and an automatic control circuit for reducing fluctuation in a light emission amount of the light emitting element relative to change in the ambient temperature of the LED.

In a preferred embodiment, the four-element, high-brightness type LED has pn junction of a semiconductor consisting of AlGaInP and comprises an optically transparent substrate, such as a GaP substrate, replacing a substrate of GaAs. With such a four-element, high-brightness type LED, the GaAs substrate having a light absorption property is replaced with the optically transparent GaP substrate, whereby light can be taken out not only from the upper face, but also from the lower face, so that high brightness can be provided.

In another preferred embodiment, the four-element, high-brightness type LED has pn junction of a semiconductor consisting of AlGaInP and comprises an optically transparent sapphire substrate replacing a substrate of GaAs. With such a four-element, high-brightness type LED, the GaAs substrate having a light absorption property is replaced with the optically transparent sapphire substrate, whereby light can be taken out not only from the upper face, but also from the lower face, so that high brightness can be provided.

In still another preferred embodiment, the four-element, high-brightness type LED has pn junction of a semiconductor consisting of AlGaInP and comprises a layer containing a metal thin film having a high light reflection factor replacing a substrate of GaAs. With such a four-element, high-brightness type LED, light going to the lower face is reflected on the metal thin film and goes to the upper face, so that high-brightness light can be provided from the upper face.

Although the photoelectric sensor unit as described above uses the four-element LED with small life degradation as the light source (light emitting element), equal drive current to that of the three-element LED in the related art is only required. Therefore, it is made possible to miniaturize the drive circuit and miniaturize the whole unit and decrease the cost of the whole unit. The same configuration as that of the APC circuit in the related art can be used as the configuration of the automatic control circuit for reducing fluctuation in the light emission amount (brightness) relative to change in the ambient temperature.

This means that the automatic control circuit is an APC circuit having a monitor light receiving element for receiving light from the light emitting element to monitor the light emitting element, the APC circuit controlling the drive current of the light emitting element based on an electric signal corresponding to a light reception amount provided from the monitor light receiving element.

Moreover, the width of the fluctuation in (reducing of) the light emission amount of the four-element LED relative to change in the ambient temperature is small as compared with the width of brightness reducing accompanying the life degradation of the three-element LED, so that it is made possible to design a small margin of the drive current.

Preferably, the automatic control circuit further comprises an ACC circuit for controlling the drive current of the light emitting element based on a voltage signal fed back from a resistor inserted in a drive circuit of the light emitting element and when an operation of the APC circuit is stopped, the ACC circuit is operated. The APC circuit acts so as to maintain the brightness constant by performing feedback control of the brightness, while the ACC circuit acts so as to maintain the drive current constant by performing feedback control of the drive current. Therefore, when the ambient temperature changes, if the APC circuit operates, the brightness of the LED is maintained roughly constant; if the APC circuit does not operate, at least the drive current is maintained constant by the ACC circuit.

Preferably, the photoelectric sensor unit of the invention further comprises a digital display for displaying a numeric value corresponding to the light reception amount output from the signal processing section. If such a display is provided, as the brightness of the LED changes with change in the ambient temperature, the change appears as change in the light reception amount and the numeric value displayed on the digital display changes. Thus, the necessity for the automatic control circuit for reducing fluctuation in the light emission amount (brightness) as described above is raised. If such a digital display is not provided, even if the absolute value of the light reception amount slightly changes, change within the range not affecting the detection performance of the object does not involve a problem.

Preferably, the photoelectric sensor unit further comprises: a light emitting optical fiber having a base end part connected to the light emitting section; and a light receiving optical fiber having a base end part connected to the light receiving section, wherein light emitted from the light emitting element is made incident directly on the base end face of the light emitting optical fiber. If the drive current of the LED is large, to avoid the adverse effect of heat generation of the LED on the base end part of the optical fiber, a structure becomes necessary for keeping a distance between the LED and the base end part of the optical fiber and placing a condensing lens therebetween. However, in the configuration of the invention, the drive current of the LED is small, so that it is made possible to bring the LED and the base end part of the optical fiber close to each other and omit a condensing lens.

DETAILED DESCRIPTION OF THE INVENTION

Referring now to the accompanying drawings, there is shown a preferred embodiment of the invention.

Figure 1:
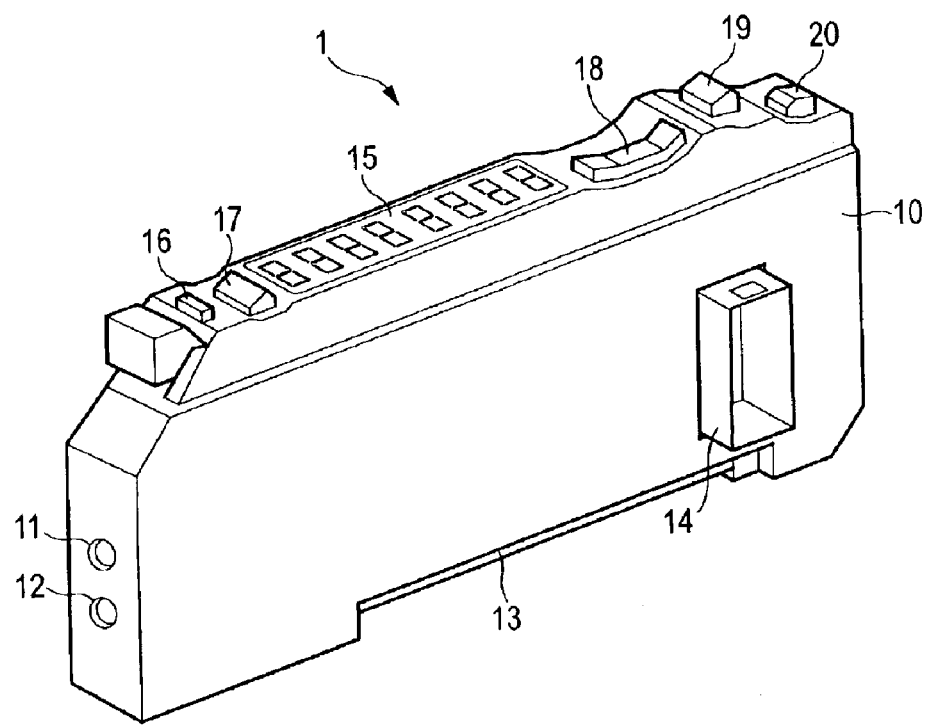
FIG. 1 is a perspective view showing the appearance of a photoelectric sensor unit according to an embodiment of the invention.

FIG. 1 is a perspective view showing the appearance of a photoelectric sensor unit (simply, photoelectric sensor) according to the embodiment of the invention. A photoelectric sensor 1 is an example of a photoelectric sensor of optical fiber type. The photoelectric sensor 1 is provided with connection parts (insertion ports) 11 and 12 oaf light emitting optical fiber and a light receiving optical fiber on the front of a case 10 shaped like a slim rectangular parallelepiped. It is provided with a cable connection part (not shown) for power supply, detection signal output, etc., on the rear of the case 10. The main unit of the photoelectric sensor 1 is also called sensor amplifier 1.

A recess well 13 of a lower face of the case 10 is an attachment section for attaching the sensor amplifier 1 to a DIN rail (standard rail for machine attachment). Normally, a plurality of sensor amplifiers 1 are attached to the DIN rail so that they are arranged side by side. The adjacent sensor amplifiers are joined mechanically and electrically by a male connector 14 provided on one side and a female connector (not shown) provided on an opposite side.

The sensor amplifier 1 is provided on the upper face with a display 15 and an output indicator (light emitting diode) 16. The display 15 uses eight (four×two) seven-segment LEDs. The output indicator (light emitting diode) 16 binarily indicates the on state or the off state of detection output as the output indicator 16 is lighted or is extinguished. The sensor amplifier 1 is also provided with pushbutton switches 17 to 20 used to set a threshold value for detection determination, switch the operation mode, the display, mode, etc. The pushbutton switch 18 is a swing-type up-down pushbutton switch.

Figure 2:
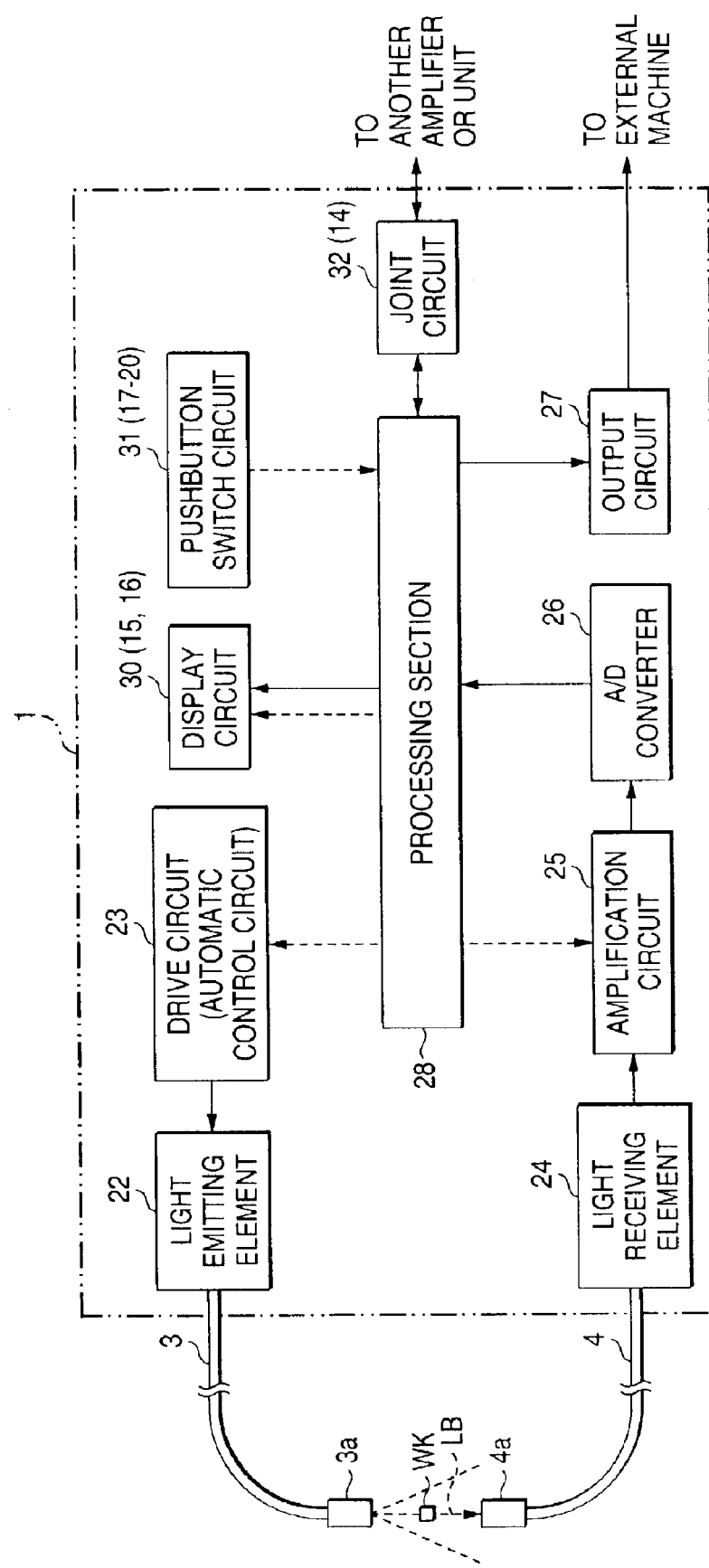
FIG. 2 is a block diagram showing the circuit configuration of the photoelectric sensor unit according to the embodiment of the invention.

FIG. 2 is a block diagram showing the circuit configuration of the photoelectric sensor according to the embodiment of the invention. In this example, a light emitting optical fiber 3 with a light emitting head 3a attached thereto and a light receiving optical fiber 4 with a light receiving head 4a attached thereto are connected to optical fiber connection parts 11 and 12 of the sensor amplifier 1, forming a transmission-type photoelectric sensor. The sensor amplifier 1 contains a light emitting element (a light emitting diode) 22 connected to the base end of the light emitting optical fiber 3 and a light receiving element (a photodiode) 24 connected to the base end of the light receiving optical fiber 4. The light emitting element 22 and the light emitting optical fiber 3 make up a light emitting section and the light receiving optical fiber 4 and the light receiving element 24 make up a light receiving section.

Light outgoing from the light emitting element 22 propagates through the light emitting optical fiber 3 and emitted as indicated by the dashed line (as spread at an angle of about 60 degrees) from the tip of the light emitting optical fiber 3 (the light emitting head 3a). Then, the light is incident on the light receiving optical fiber 4 through the light receiving head 4a placed at a position opposed to the light emitting head 3a, and propagates through the light receiving optical fiber 4 to the light receiving element 24. When an object to be detected WK blocks an optical path LB from the light emitting head 3a to the light receiving head 4a, the light reception amount of the light receiving element 24 is reduced and thus the presence or absence of the object to be detected WK can be detected.

To form a reflection-type photoelectric sensor, the positions and orientations of the light emitting head 3a to the light receiving head 4a are set so that light emitted from the light emitting head 3a is reflected on the object to be detected WK and is incident on the light receiving optical fiber 4 through the light receiving head 4a. Alternatively, a head section comprising the light emitting head 3a and the light receiving head 4a in one piece is used. Various types of photoelectric sensors are available. For example, in a photoelectric sensor called amplifier separation type, a head section contains a light emitting element and a light receiving element, and the head section and a sensor amplifier are connected by an electric cable rather than an optical fiber.

In FIG. 2, the sensor amplifier 1 contains a drive circuit 23 of the light emitting element 22 and a processing section (microprocessor) 28 for controlling the drive circuit 23. The drive circuit 23 contains an automatic control circuit consisting of an APC circuit and an ACC circuit for performing feedback control of the brightness and the drive current of the light emitting element 22. The drive circuit is described later in detail.

The sensor amplifier 1 also contains an amplification circuit 25 for amplifying an electric signal corresponding to the light reception amount output from the light receiving element 24 and an A/D converter 26 for converting an output voltage of the amplification circuit 25 into a digital value. The digital value provided by the A/D converter 26 is input to the processing section 28, which then compares the input digital value with a threshold value described later and outputs the comparison result from an output circuit 27 to an external machine as a binary signal indicating the presence or absence of the object to be detected WK. Therefore, the amplification circuit 25 and the A/D converter 26 (and the processing section 28) correspond to a signal processing section for amplifying and processing the electric signal corresponding to the light reception amount. The photoelectric sensor of the embodiment uses the 12-bit A/D converter 26 and outputs a digital value of 0 to 4095 (decimal number).

The sensor amplifier 1 also contains a display circuit 30 corresponding to the display 15 and the indicator 16, a pushbutton switch circuit 31 corresponding to the pushbutton switches 17 to 20, and a joint circuit 32 corresponding to the joint connectors (male connector 14 and female connector). The processing section 28 also controls the components. In FIG. 2, flows of data related to the light reception amount and detection value of input/output signals of the processing section 28 are indicated by solid arrows and other control signals are indicated by dashed-line arrows.

Figure 3:
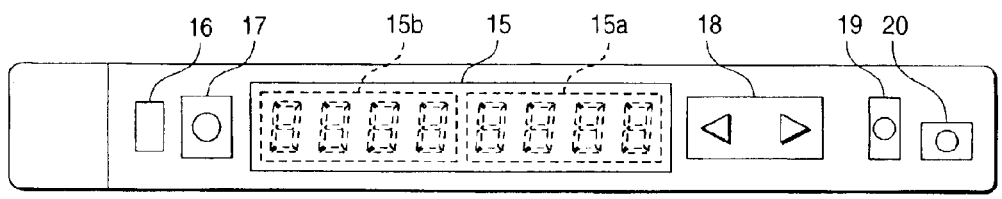
FIG. 3 is a top view of the photoelectric sensor unit shown in FIG. 1.
Figure 4:
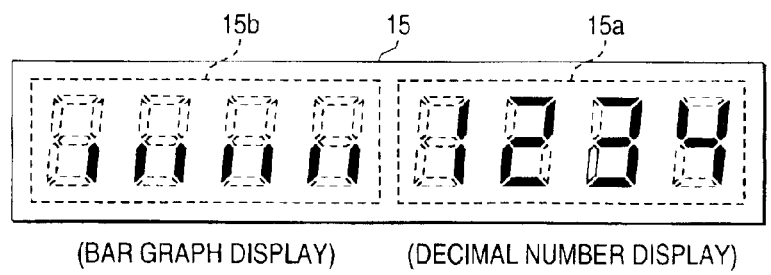
FIG. 4 is a drawing showing a display example of a display.

FIG. 3 is a top view of the photoelectric sensor shown in FIG. 1. The display 15 placed on the sensor amplifier 1 is a seven-segment eight-digit display and comprises a first display section 15a consisting of four digit places and a second display section 15b consisting of four digit places, the first and second display sections being arranged side by side. For example, the display 15 can be used in such a manner that the first display section 15a (low-order four digits) displays the detection value in decimal notation and the second display section 15b (high-order four digits) displays the threshold value (setup value) in decimal notation during the detection operation. Alternatively, the display 15 can be used in such a manner that the first display section 15a displays the detection value or the threshold value in decimal notation and some segments of each digit place of the second display section 15b are used to display the detection value or the threshold value in a bar graph, as shown in FIG. 4.

Figure 5:
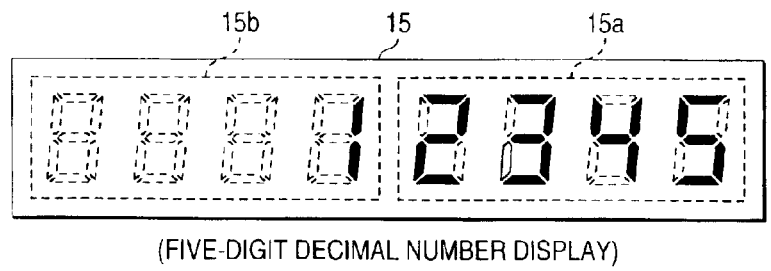
FIG. 5 is a drawing showing another display example of the display.

The photoelectric sensor of the embodiment comprises a high-precision mode for displaying the detection value or the threshold value in five digits in decimal notation in addition to the normal mode for displaying the detection value or the threshold value in four digits at the maximum in decimal notation. To display the detection value (or the threshold value) in the high-precision mode, both of the first display section 15a and the second display section 15b are used (joined) to display a five-digit decimal number as shown in FIG. 5. Of course, if the first display section 15a and the second display section 15b are joined, it is made possible to display a decimal number of a maximum of eight digits.

Next, use examples of the pushbutton switches 17 to 20 will be discussed briefly. Each key is shared among a plurality of functions and in the following use examples, the switches are used for some of the functions.

To begin with, to set a threshold value, the pushbutton switch 17 (set SW) and a pushbutton switch 18 (up-down SW) are used. For example, in FIG. 2, the object to be detected WK is placed so as to block the optical path LB from the light emitting head 3a to the light receiving head 4a and the set SW 17 is pressed and then is again pressed with the object to be detected WK removed from the optical path LB. Consequently, the intermediate value between the detection value corresponding to the light reception amount when the object to be detected WK blocks the optical path LB (for example, 2000) and the detection value corresponding to the light reception amount when the object to be detected WK does not block the optical path LB. (for example, 4000), namely, in this case, 3000 is automatically set as the threshold value.

At this time, the setup threshold value is displayed on the display 15. In the normal mode, the four-digit value is displayed on either of the first display section 15a and the second display section 15b. The up-down SW 18 can be used to increment or decrement the setup threshold value for adjustment.

Figure 6:
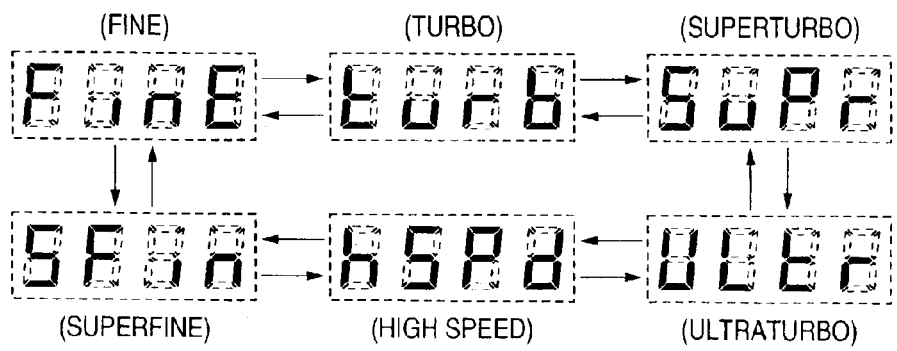
FIG. 6 is a drawing showing a display transition example of operation mode.

Next, to set the operation mode, the pushbutton switch 19 (mode SW) and the up-down SW 18 are used. If the operator continues to press the mode SW 19 for a given time (for example, two seconds) or more, it is made possible to change setting of the operation mode and the operator can use the up-down SW 18 to select the operation mode in order. At this time, the selected operation mode is displayed on the display 15 in abridged alphabetic letters. For example, as shown in FIG. 6, the operation mode is changed among the six types of FINE, TURBO, SUPERTURBO, ULTRATURBO, HIGH SPEED, and SUPERFINE in the normal and reverse directions as the operator presses the up-down SW 18.

The six types of operation modes are provided for optimizing the circuit conditions of the appropriate light emission amount (drive current of light emitting element 22), sensitivity (amplification degree of amplification circuit 25), etc., in response to the size of the object to be detected, the distance thereto, etc. For example, the FINE mode corresponds to the normal mode and is optimized to the distance from the light emitting head 3a to the object to be detected WK, about 100 mm. The turbo mode is optimized to 200 mm, the SUPERTURBO mode to 300 mm, and the ULTRATURBO mode to 400 mm. The HIGH SPEED mode is an operation mode with the response speed made high so as to be able to detect the object to be detected WK crossing the optical path LB at comparatively high speed.

The SUPERFINE mode corresponds to the high-precision mode. In the SUPERFINE mode, the light emission amount or the sensitivity (amplification factor) is made lower than that in the FINE mode (normal mode), whereby if the distance from the light emitting head 3a to the object to be detected WK is made shorter than that in the FINE mode, the amplification circuit 25 or the A/D converter 26 is made hard to be saturated. In doing so, the spread of the emitted light spot diameter is reduced and if the object to be detected WK is small (or thin), it can be detected precisely.

In addition to the described operation modes, the photoelectric sensor comprises various modes such as a differentiation mode of performing differentiation operation on detection value change and outputting a rising or falling edge detection signal and a timer mode of outputting a detection signal in a delay time (that can be set) after the rising or falling edge. A plurality of display modes of the display 15 are also provided. Each of the modes can be switched by combining the pressing order of the pushbutton switches 17 to 20 and the pressing way (for example, pressing for two seconds or more, twice pressing, etc.).

Since the detection value is displayed in digital form as described above, not only change in the light reception amount necessary for the detection operation, but also precision of the detection value is required. If display of the detection value changes with change in the ambient temperature or life degradation, there is a fear of impairing the user's reliability of the unit. Then, the photoelectric sensor of the embodiment uses a four-element, high-brightness type LED with small brightness degradation caused by life degradation and moreover large brightness (light emission amount) for the same drive current as the light emitting element 22 and comprises the automatic control circuit for reducing fluctuation in the light emission amount relative to change in the ambient temperature in the LED drive circuit 23.

To begin with, the four-element, high-brightness type LED used as the light emitting element 22 will be discussed.

U.S. Pat. No. 5,008,718 describes an example the four-element, high-brightness type LED. This LED is a four-element LED using pn junction of a semiconductor consisting of AlGaInP wherein substrate of GaAs is replaced with substrate of GaP. Since GaP is high in light transmittance as compared with GaAs, not only light outgoing from the front of the pn junction, but also light outgoing from the rear of the pn junction can be effectively used for providing high brightness.

That is, the light outgoing from the rear of the pn junction is absorbed in the non-transparent GaAs substrate, but is scarcely absorbed in the transparent GaP substrate and passes through the GaP substrate. The light passing through the GaP substrate is reflected on a reflecting plate (reflecting cup) placed on the rear of the LED and goes to the front. The light outgoing from the rear of the pn junction is thus added to the light outgoing from the front of the pn junction, whereby high brightness is provided.

FIGS. 11A to 11E are sectional views showing schematically a manufacturing process of the four-element, high-brightness type LED. First, as shown in steps (a) and (b), an additive is added on a GaAs substrate 61 to crystal-grow an AlGaInP layer 62. Next, as shown in step (c), a GaP layer 63 is grown on the AlGaInP layer 62. Since the GaP layer is optically transparent and has smaller refractive index than the AlGaInP layer 62 has and larger refractive index than air has, when light emitted from the AlGaInP layer 62 is released into the atmosphere, the loss caused by total reflection is lessened and the light emission efficiency is raised.

Next, as shown in step (d), the GaAs substrate 61 having a light absorption property is cut away and as shown in step (e), a window material made of an optically transparent GaP layer 64 is put on the AlGaInP layer 62. Thus, the GaAs substrate 61 having a light absorption property is replaced with the optically transparent GaP layer 64.

As another four-element, high-brightness type LED, the GaAs substrate 61 having a light absorption property is replaced with an optically transparent sapphire substrate. That is, in step (e) in FIG. 11E, a sapphire substrate is put in place of the GaP layer 64. However, since sapphire is non-conductive, two electrodes are taken through the top GaP layer 63. With the LED, like the above-described LED, light emitted from the AlGaInP layer 62 is also radiated downward (to the rear) through the optically transparent sapphire substrate, so that high brightness is provided.

Figure 12:
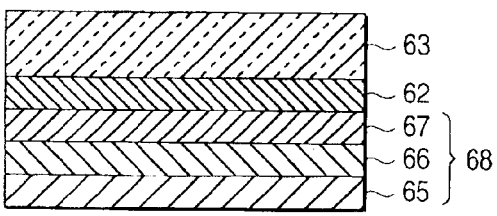
FIG. 12 is a drawing showing schematically a cross-sectional structure example of another four-element, high-brightness type LED.

As still another four-element, high-brightness type LED, the GaAs substrate 61 having a light absorption property is replaced with a layer containing a metal thin film having a high light reflection factor. FIG. 12 schematically shows the cross-sectional structure of the LED. A layer 68 comprising an Au thin film 66 and an Al thin film 67 formed on an n-type silicon substrate 65 is put on the lower face of AlGaInP layer 62. With the LED, light radiated downward from the AlGaInP layer 62 is reflected on the Al thin film 67 having a high reflection factor and is taken out from top GaP layer 63.

The photoelectric sensor unit of the embodiment may use any of the four-element, high-brightness type LEDs as described above.

Figure 7:
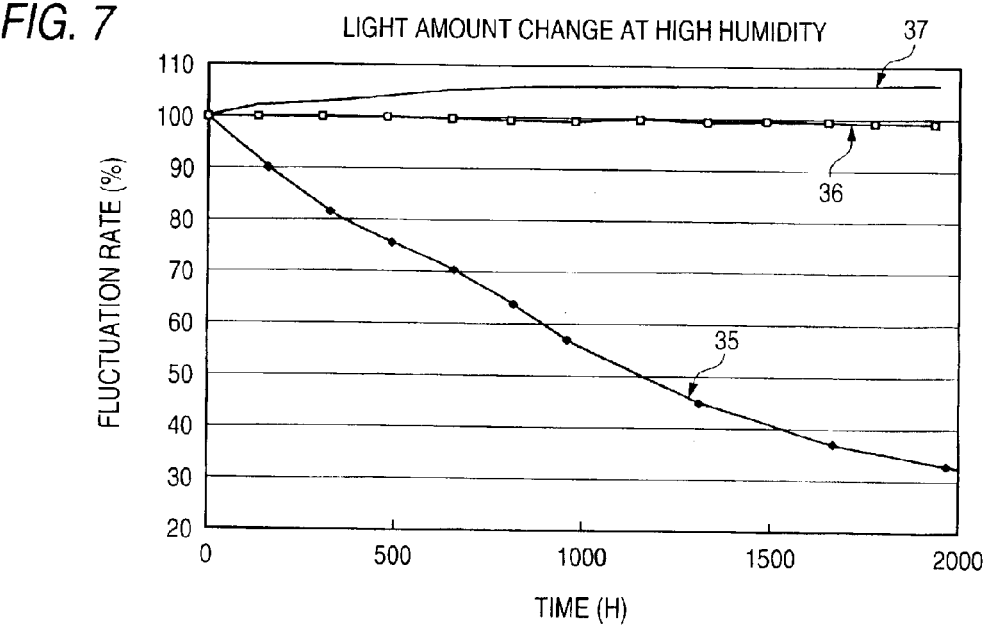
FIG. 7 is a graph showing change in the light emission amount caused by life degradation at high humidity as comparison between the measurement results on three-element and four-element LEDs.

FIG. 7 is a graph showing change in the brightness (light emission amount) caused by life degradation at high humidity as comparison between the measurement results on three-element and four-element LEDs. A curve 35 indicates the degradation characteristic of the three-element LED having pn junction of a semiconductor consisting of AlGaAs (aluminum, gallium, arsenic) (photoelectric sensor unit in the related art). When the use time reaches about 2000 hours at high humidity, the brightness is reduced to near 30%. The brightness is maintained almost constant as indicated by the curve 36 by the action of an APC circuit for detecting the brightness of the LED with a monitor light receiving element and controlling the drive current of the LED so that the brightness becomes constant.

Life design was conducted assuming that the brightness of the LED is reduced to 50% because of life degradation under the actual use condition. Therefore, the LED drive circuit 23 has a margin designed so as to ensure a current capacity about twice the drive current just after the use start.

In the graph in FIG. 7, a curve 37 indicates the degradation characteristic of the four-element LED having pn junction of a semiconductor consisting of AlGaInP (aluminum, gallium, indium, phosphorus) (the photoelectric sensor unit of the embodiment) The measurement example in FIG. 7 indicates that the brightness is not reduced with the passage of use time and slightly rises. It is seen that with the furthermore passage of use time, the brightness turns to falling, but the inclination of the falling is small and the brightness scarcely is reduced if the LED is used for a long time.

Figure 8:
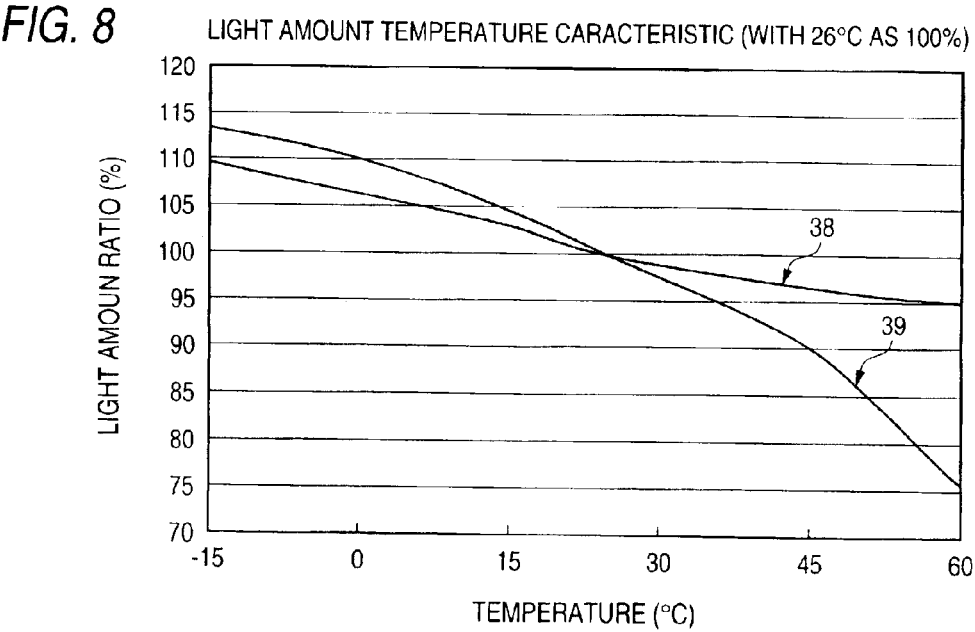
FIG. 8 is a graph showing fluctuation in the light emission amount relative to change in ambient temperature as comparison between the measurement results on the three-element and four-element LEDs.

FIG. 8 is a graph showing fluctuation in the brightness (light emission amount) relative to change in the ambient temperature as comparison between the measurement results on the three-element and four-element LEDs. A curve 38 indicates fluctuation in the brightness of the three-element LED and a curve 39 indicates fluctuation in the brightness of the four-element LED. The brightness at ambient temperature 26° C. is 100% and the fluctuation in the brightness relative to change in the ambient temperature is represented in percentage as the fluctuation rate (light amount ratio).

The four-element, high-brightness type LED used as the light emitting element 22 of the photoelectric sensor unit of the embodiment has the feature of scarcely reducing the brightness accompanying life degradation and high brightness, but has the drawback of large brightness fluctuation relative to change in the ambient temperature as compared with the three-element Led as shown in FIG. 8. In the measurement example in FIG. 8, when the ambient temperature changes from −15° C. to +60° C., the brightness fluctuation of the three-element LED is from about +10% to about −5%, while the brightness fluctuation of the four-element LED reaches from about +13% to near −25%.

If the detection value is displayed in digital form as with the photoelectric sensor unit of the embodiment, the brightness fluctuation relative to change in the ambient temperature as described above appears as fluctuation in the display value. Moreover, if the high-precision mode for producing five-digit decimal number display is provided as with the photoelectric sensor unit of the embodiment, fluctuation in the display value becomes easily noticeable. To reduce such fluctuation, the LED drive circuit 23 in the photoelectric sensor unit of the embodiment comprises the automatic control circuit for performing feedback control of the brightness of the LED.

As the automatic control circuit, the configuration of the APC circuit for compensating for reducing of the brightness accompanying life degradation in the photoelectric sensor unit using the three-element LED in the related art can be used intact. That is, the APC circuit for detecting the brightness of the LED with a monitor light receiving element and controlling the drive current of the LED so that the brightness becomes constant can be used as the automatic control circuit of the present invention. However, in the photoelectric sensor unit using the three-element LED in the related art, the LED drive circuit 23 has a margin designed so as to ensure a current capacity about twice the drive current assuming that the brightness of the LED is reduced to 50% as described above, while in the photoelectric sensor unit of the embodiment using the four-element LED, the margin of the current capacity of the LED drive circuit 23 can be reduced to about 30% (1.3 times the current capacity at ambient temperature 26° C.).

That is, as previously described with reference to FIG. 8, if it is assumed that the ambient temperature rises to 60° C., reducing of the brightness of the LED falls within −25% and thus the margin of 30% is sufficient as the increment of the drive current of the LED to compensate for reducing of the brightness. Of course, the drive circuit containing the APC circuit used with the photoelectric sensor unit using the three-element LED may be used intact and it is also possible to miniaturize as much as the margin of the current capacity can be lessened.

Figure 9:
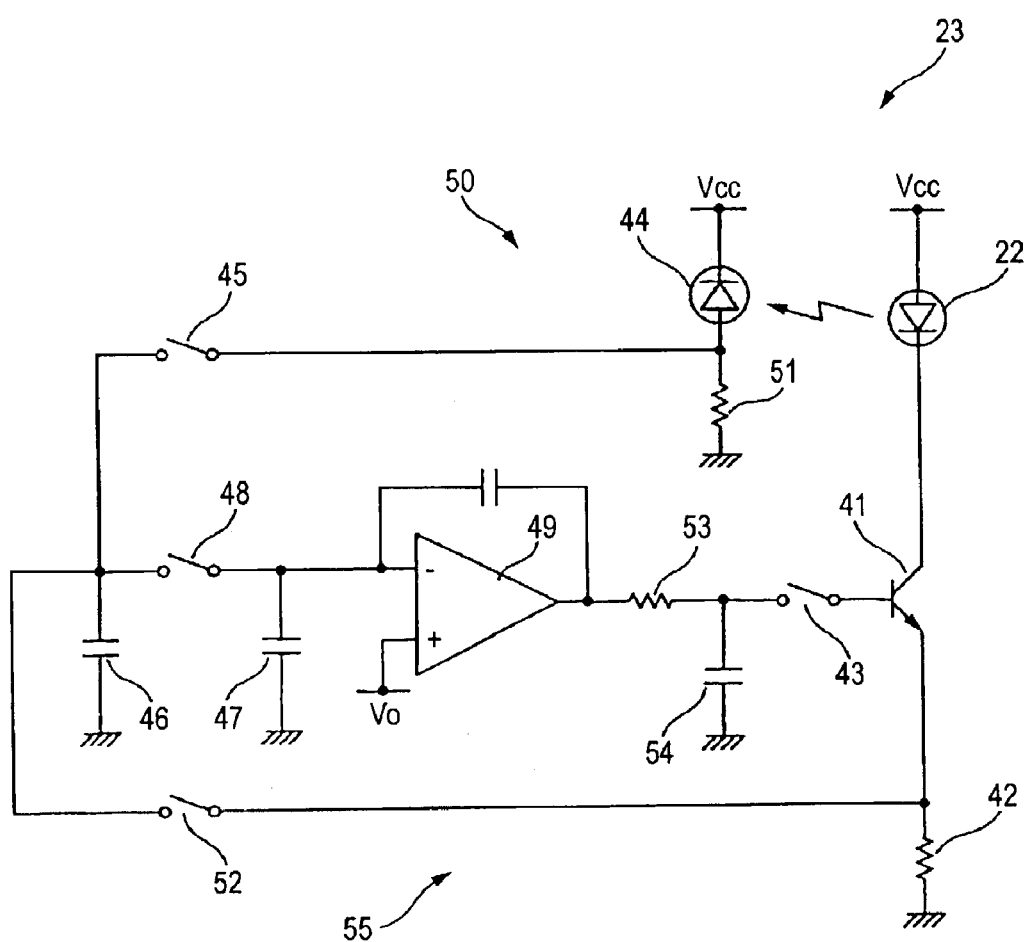
FIG. 9 is a circuit diagram showing a specific example of an LED drive circuit containing an APC circuit.

FIG. 9 is a circuit diagram showing a specific example of the LED drive circuit 23 containing the APC circuit. The drive circuit 23 of the LED (light emitting element) 22 comprises a transistor 41 for allowing a pulse drive current to flow into the LED 22 and the LED 22 is connected between the collector of the transistor 41 and power supply Vcc. The emitter of the transistor 41 is grounded through a drive current detection resistor 42.

The base of the transistor 41 is provided with a drive control switch 43 for controlling turning on and off the transistor 41 to allow a drive current to flow into the LED 22 in a predetermined period and on time period (pulse width) In fact, turning on/off the drive control switch 43 is controlled by a signal from an output port of the microprocessor or an electronic circuit. The ratio between the on and off time periods is set to 1:50 to 1:100 or so. Consequently, the LED 22 is pulse-driven at the on-off ratio of about 1:50 to 1:100. Whenever the LED 22 emits light once (by one pulse current), the light propagates through the light emitting optical fiber 3 and the light receiving optical fiber 4 to the light receiving element 24 and the detection voltage corresponding to the light reception amount is provided.

The peak value of the pulse drive current for determining the brightness (light emission amount) of the LED 22 is controlled by the base current flowing into the transistor 41, and the base current is controlled by an APC (automatic power control) circuit 50 consisting of a monitor light receiving element (photodiode) 44, a brightness feedback switch 45, a first capacitor 46, a second capacitor 47, a short-circuit switch 48, an operational amplifier 49, etc.

That is, when a part of the light emitted from the LED 22 is received by the monitor light receiving element 44, the voltage proportional to the light reception amount (namely, proportional to the light emission amount of the LED 22) occurs across a resistor 51. At this time, the brightness feedback switch 45 is closed and the short-circuit switch 48 is open and thus the first capacitor 46 is charged to the voltage across the resistor 51. A current feedback switch 52 forming a part of ACC (automatic current control) circuit described later remains open during the operation of the APC circuit 50.

When the drive control switch 43 is opened (turned off) with the termination of the light time period (on time period) of the LED 22, the brightness feedback switch 45 is opened and the short-circuit switch 48 is closed. In fact, the brightness feedback switch 45 is opened a little before the drive control switch 43 is opened, preventing charges of the first capacitor 46 from backward flowing through the brightness feedback switch 45. When the short-circuit switch 48 is closed, the charges of the first capacitor 46 flow into the second capacitor 47 and charge voltages of the first capacitor 46 and the second capacitor 47 become equal. The charge voltage determines the base current of the transistor 41 for determining the drive current at the next pulse drive time. This means that the output voltage of the operational amplifier 49 and by extension the base current of the transistor 41 is determined in response to the difference between the charge voltage of the first capacitor 46 and the second capacitor 47 and reference voltage Vo.

For example, if the light emission amount of the LED 22, namely, the light reception amount of the monitor light receiving element 44 increases and the charge voltage of the first capacitor 46 and the second capacitor 47 is raised, the operational amplifier 49 acts so as to reduce the output voltage accordingly. As the output voltage of the operational amplifier 49 is reduced, the output voltage of an integration circuit consisting of a resistor 53 connected to an output terminal of the operational amplifier 49 and a capacitor 54 (charge voltage of the capacitor 54) is reduced and the base current of the transistor 41 when the drive control switch 43 is next closed decreases. Consequently, the drive current of the LED 22 decreases and the light emission amount (brightness) is reduced.

In contrast, if the light emission amount of the LED 22, namely, the light reception amount of the monitor light receiving element 44 decreases and the charge voltage of the first capacitor 46 and the second capacitor 47 is reduced, the operational amplifier 49 acts so as to raise the output voltage. Consequently, the charge voltage of the capacitor 54 rises and the base current of the transistor 41 when the drive control switch 43 is next closed increases. Thus, the drive current of the LED 22 increases and the light emission amount (brightness) increases.

The light emission amount (brightness) of the LED 22 is maintained constant by a kind of negative feedback control as described above. That is, if the light emission amount of the LED 22 is about to change because of change in the ambient temperature, the drive current of the LED 22 changes in the direction of compensating for the change and consequently, the light emission amount (brightness) of the LED 22 is maintained constant.

In the photoelectric sensor unit of the embodiment, the LED 22 is pulse-driven and the pulse width is small and thus it is hard to perform feedback control with the time of one pulse drive. Then, the feedback amount corresponding to the light emission amount of the LED 22 detected by the monitor light receiving element 44 is used to control the drive current at the next pulse drive time by the action of the APC circuit 50 as described above. Usually, in one measurement (detection) of the photoelectric sensor unit, processing of successively performing more than one (more than one pulse) light emitting and light receiving operation and using the value resulting from averaging a plurality of detection values as the final detection value is performed. Therefore, even if discrete feedback control with a delay of one pulse as described above is performed, the detection value provided as a result becomes stable as continuous feedback control is performed.

The drive circuit 23 of the LED 22 shown in FIG. 9 includes an ACC (automatic current control) circuit 55 consisting of the drive current detection resistor 42, the current feedback switch 52, the first capacitor 46, the second capacitor 47, the short-circuit switch 48, the operational amplifier 49, etc., in addition to the APC circuit as described above. The ACC circuit 55 feeds back the voltage occurring across the drive current detection resistor 42 through the current feedback switch 52 and controls the base current of the transistor 41 in response to the voltage, thereby maintaining the drive current constant.

That is, when the transistor 41 is on and the drive current of the LED 22 flows, the current feedback switch 52 is closed. A voltage proportional to the drive current occurs in the drive current detection resistor 42 and the first capacitor 46 is charged to the voltage. The brightness feedback switch 45 of the APC circuit 50 remains open during the operation of the ACC circuit 55.

When the drive control switch 43 is opened (turned off) with the termination of the pulse drive time period of the LED 22, the current feedback switch 52 is opened and the short-circuit switch 48 is closed. In fact, the current feedback switch 52 is opened a little before the drive control switch 43 is opened, preventing charges of the first capacitor 46 from backward flowing through the current feedback switch 52. When the short-circuit switch 48 is closed, the charges of the first capacitor 46 flow into the second capacitor 47 and charge voltages of the first capacitor 46 and the second capacitor 47 become equal. The subsequent operation, namely, the circuit operation of the operational amplifier 49, the resistor 53, the capacitor 54, etc., is similar to the operation of the APC circuit 50 described above.

For example, if the drive current of the LED 22 increases and the charge voltage of the first capacitor 46 and the second capacitor 47 is raised, the operational amplifier 49 acts so as to reduce the output voltage accordingly. Consequently, the charge voltage of the capacitor 54 is reduced and thus the base current of the transistor 41 when the drive control switch 43 is next closed decreases, and the drive current of the LED 22 decreases.

In contrast, if the drive current of the LED 22 decreases and the charge voltage of the first capacitor 46 and the second capacitor 47 is reduced, the operational amplifier 49 acts so as to raise the output voltage accordingly. Consequently, the charge voltage of the capacitor 54 rises and thus the base current of the transistor 41 when the drive control switch 43 is next closed increases, and the drive current of the LED 22 increases.

As for the operation of the ACC circuit 55, like the APC circuit 50, the feedback amount corresponding to the drive current of the LED 22 detected by the drive current detection resistor 42 is also used to control the drive current at the next pulse drive time. Even if discrete feedback control with a delay of one pulse is performed, the drive current can be maintained roughly constant as continuous feedback control is performed from the viewpoint of the detection value provided as a result for the reason described above.

Figure 10A:
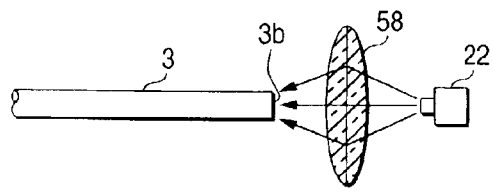
FIGS. 10A and 10B are drawings showing connection of the base end face of a light emitting optical fiber and light emitting element as comparison between the configuration in related art and the configuration of the embodiment.
Figure 10B:
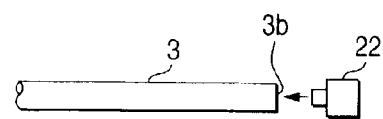
Figure 11A:
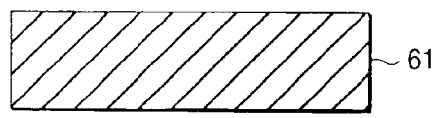
FIGS. 11A to 11E are sectional views showing schematically a manufacturing process of a four-element, high-brightness type LED.
Figure 11B:
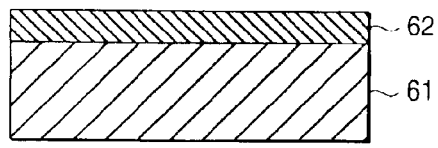
Figure 11C:
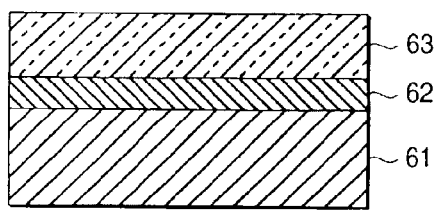
Figure 11D:
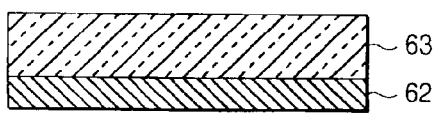
Figure 11E:
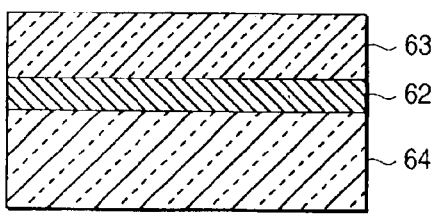

Next, FIGS. 10A and 10B are drawings showing connection of the base end face of the light emitting optical fiber and the light emitting element (LED) 22 as comparison between the configuration in the related art and the configuration of the embodiment. FIG. 10A shows the configuration wherein the four-element LED in the related art not providing high brightness is used and FIG. 10B shows the configuration wherein the high-brightness, four-element LED according to the embodiment is used.

As described above, to use the four-element LED in the related art not providing high brightness (wherein the substrate is not transparent), a current near three times the drive current of a three-element LED needs to be made to flow to provide equal brightness to that of the three-element LED. Consequently, the LED generates large heat and thus to avoid the adverse effect of the heat on the base end part of the optical fiber 3, it is necessary to keep a predetermined distance between the LED 22 and the base end face 3b of the optical fiber 3. In this case, to make light emitted at a predetermined diffusion angle from the LED 22 incident on the base end face 3b of the optical fiber 3 as much as possible, a condensing lens 58 needs to be placed between the LED 22 and the base end face 3b of the optical fiber 3 as shown in FIG. 10A.

In contrast, to use the high-brightness, four-element LED as in the configuration of the embodiment, a current almost equal to the drive current of the three-element LED can provide the brightness to the same degree. Therefore, the heat generation of the LED 22 is comparatively small and thus the LED 22 can be placed close to the base end face 3b of the optical fiber 3 as shown in FIG. 10B. Consequently, the light emitted from the LED 22 can be made incident directly on the base end face 3b of the optical fiber 3 without using a condensing lens. This can contribute to miniaturization of the whole unit and a decrease in the cost.

The invention is not limited to the above-described embodiment and various changes and modifications may be made in the invention without departing from the spirit and scope thereof. For example, the invention can be applied not only to the photoelectric sensor unit using optical fibers, but also to a photoelectric sensor unit called amplifier separation type wherein a head section containing a light emitting element and a light receiving element and an amplification section are connected by an electric cable. The invention can be applied not only to the photoelectric sensor unit also called photoelectric switch for detecting the presence or absence of the object to be detected, but also to a photoelectric sensor unit for detecting the shape, color, displacement, etc., of the object to be detected in a detection area by light.

As described above, according to the photoelectric sensor of the invention, the four-element, high-brightness type LED with long life and small brightness degradation is used as the light emitting element forming a part of the light emitting section and the automatic control circuit is provided for reducing fluctuation in the light emission amount relative to change in the ambient temperature, so that the photoelectric sensor unit excellent in detection accuracy (for example, having high display accuracy of the detection value) can be provided. Moreover, considering that the drive current may be as much as that of the three-element LED in the related art and that brightness reducing caused by life degradation is small, a small margin of the current capacity of the drive circuit can be designed, which can contribute to miniaturization of the whole unit and a decrease in the cost.

What is claimed is:

1. A photoelectric sensor unit comprising:

a light emitting section for emitting light to a detection area, the light emitting section including a light emitting element having a four-element, high-brightness type LED;

a light receiving section for receiving light from the detection area;

a signal processing section for amplifying and processing an electric signal corresponding to a light reception amount output from said light receiving section; and an automatic control circuit for reducing fluctuation in a light emission amount of the light emitting element relative to change in ambient temperature of the LED.

2. The photoelectric sensor unit as claimed in claim 1, wherein the four-element, high-brightness type LED has pn junction of a semiconductor consisting of AlGaInP and comprises an optically transparent substrate replacing a substrate of GaAs.

3. The photoelectric sensor unit as claimed in claim 2, wherein the optically transparent substrate is a GaP substrate.

4. The photoelectric sensor unit as claimed in claim 2, wherein the optically transparent substrate is an optically transparent sapphire substrate.

5. The photoelectric sensor unit as claimed in claim 1, wherein the four-element, high-brightness type LED has pn junction of a semiconductor consisting of AlGaInP and comprises a layer containing a metal thin film having a high light reflection factor replacing a substrate of GaAs.

6. The photoelectric sensor unit as claimed in claim 1, wherein the automatic control circuit comprises an APC circuit having a monitor light receiving element for receiving light from the light emitting element to monitor the light emitting element, the APC circuit controlling a drive current of the light emitting element based on an electric signal corresponding to a light reception amount provided from the monitor light receiving element.

7. The photoelectric sensor unit as claimed in claim 6, wherein the automatic control circuit further comprises an ACC circuit for controlling the drive current of the light emitting element based on a voltage signal fed back from a resistor inserted in a drive circuit of the light emitting element and wherein when an operation of the APC circuit is stopped, the ACC circuit is operated.

8. The photoelectric sensor unit as claimed in claim 6, wherein the emitting element is pulse-driven, and
wherein the APC circuit controls a peak value of the drive current of the emitting element as discrete feedback control.

9. The photoelectric sensor unit as claimed in claim 1, further comprising:
a digital display for displaying a numeric value corresponding to the light reception amount output from said signal processing section.

10. The photoelectric sensor unit as claimed in claim 9, further comprising:
a selection means for selecting one of an operation mode for optimizing an operating condition corresponding to an object to be detected in the detection area,
wherein said digital display comprises a plurality of digits,
wherein the operation mode comprises normal mode and high precision mode in which number of maximum digits of the numeric value displayed on said digital display is more than that in the normal mode, and
wherein said photoelectric sensor unit operates corresponding to the operation mode selected by said selection means.

11. The photoelectric sensor unit as claimed in claim 9, further comprising:
a selection means for selecting one of an operation mode for optimizing an operating condition corresponding to an object to be detected in the detection area,
wherein said digital display displays one of the operation mode selected by said selection means, and
wherein said photoelectric sensor unit operates corresponding to the operation mode selected by said selection means.

12. The photoelectric sensor unit as claimed in claim 9, further comprising:
an output section for comparing a numeric value corresponding to the light reception amount output from said signal processing section with a threshold value and outputting a result of comparison the numeric value with the threshold value to an external machine as a binary signal; and
an adjustment means for adjusting the threshold value,
wherein said digital display comprises a first display section for displaying the numeric value corresponding to the light reception amount output from said signal processing section and a section display section for displaying the threshold value adjusted by said adjustment means.

13. The photoelectric sensor unit as claimed in claim 1, further comprising:
a light emitting optical fiber having a base end part connected to said light emitting section; and
a light receiving optical fiber having abase end part connected to said light receiving section,
wherein light emitted from the light emitting element is made incident directly on a base end face of the light emitting optical fiber.

14. The photoelectric sensor unit as claimed in claim 1, further comprising:
a selection means for selecting one of an operation mode for optimizing an operating condition corresponding to an object to be detected in the detection area,
wherein the operation mode comprises normal mode and high precision mode in which saturation is made harder than that in the normal mode, and
wherein said photoelectric sensor unit operates corresponding to the operation mode selected by said selection means.

15. The photoelectric sensor unit as claimed in claim 1, further comprising:
a selection means for selecting one of an operation mode for optimizing an operating condition corresponding to an object to be detected in the detection area,
wherein the operation mode comprises normal mode and high precision mode in which the light emission amount of the light emitting element is made lower than that in the normal mode, and
wherein said photoelectric sensor unit operates corresponding to the operation mode selected by said selection means.

16. The photoelectric sensor unit as claimed in claim 1, further comprising:
a selection means for selecting one of an operation mode for optimizing an operating condition corresponding to an object to be detected in the detection area,
wherein said operation mode comprises normal mode and high precision mode in which sensitivity is made lower than that in the normal mode, and
wherein said photoelectric sensor unit operates corresponding to the operation mode selected by said selection means.

17. A photoelectric sensor unit comprising:
a light emitting section for emitting light to a detection area, the light emitting section including a light emitting element having a four-element, high-brightness type LED, wherein the light emitting element is pulse-driven;
a light receiving section for receiving light from the detection area;
a signal processing section for amplifying and processing an electric signal corresponding to a light reception amount output from said light receiving section; and
an APC section for reducing fluctuation in a light emission amount of the light emitting element relative to change in ambient temperature of the LED, the APC section comprising a monitor light receiving element for receiving light from the light emitting element to monitor the light emitting element,
wherein the APC section controls a peak value of a drive current of the emitting element based on an electric signal corresponding to a light reception amount provided from the monitor light receiving element as discrete feedback control.

18. A photoelectric sensor unit comprising:
a light emitting section for emitting light to a detection area, the light emitting section including a light emitting element having a four-element, high-brightness type LED;
a light receiving section for receiving light from the detection area;
a signal processing section for amplifying and processing an electric signal corresponding to a light reception amount output from said light receiving section;

a digital display for displaying a numeric value corresponding to the light reception amount output from said light receiving section; and an APC section for reducing fluctuation in a light emission amount of the light emitting element relative to change in ambient temperature of the LED, the APC section comprising a monitor light receiving element for receiving light from the light emitting element to monitor the light emitting element;

wherein the APC section controls a drive current of the emitting element based on an electric signal corresponding to light reception amount provided form the monitor light receiving element.

19. A photoelectric sensor unit comprising:

a light emitting section for emitting light to a detection area, the light emitting section including a light emitting element having a four-element type LED, wherein the light emitting element is pulse-driven;

a light receiving section for receiving light from the detection area;

a signal processing section for amplifying and processing an electric signal corresponding to a light reception amount output from said light receiving section;

an output section for comparing a numeric value corresponding to the light reception amount output from said signal processing section with a threshold value and outputting a result of the comparison the numeric value with the threshold value to an external machine as a binary signal;

an adjustment section for adjusting the numeric threshold value;

a digital display comprising a first display section for displaying the numeric value corresponding to the light reception amount output from said signal processing section and a second display section for displaying the threshold value adjusted by said adjustment section; and an APC section for reducing fluctuation in a light emission amount of the light emitting element relative to change in ambient temperature of the LED, the APC section comprising a monitor light receiving element for receiving light from the light emitting element to monitor the light emitting element, wherein the APC section controls a drive current of the emitting element based on an electrical signal corresponding to a light reception amount provided from the monitor light receiving element.

20. The photoelectric sensor unit as claimed in claim 19, further comprising:

a selection means for selecting one of an operation mode for optimizing an operating condition corresponding to an object to be detected in the detection area, wherein said digital display comprises a plurality of digits, wherein the operation mode comprising normal mode and high precision mode in which number of maximum digits of the numeric value displayed on said digital display is more than that in the normal mode, and wherein said photoelectric sensor unit operates corresponding to the operation mode selected by said selection means.

21. A photoelectric sensor unit comprising:

a light emitting section for emitting light to a detection area, the light emitting section including a light emitting element having a four-element, high-brightness type LED;

a light receiving section for receiving light from the detection area;

a signal processing section for amplifying and processing an electric signal corresponding to a light reception amount output from said light receiving section;

a selection means for selecting one of an operation mode for optimizing an operating condition corresponding to an object to be detected in the detection area, wherein the operation mode comprises normal mode and light reception mode in which the light emission amount of the light emitting element is made lower than that in the normal mode, wherein said photoelectric sensor unit operates corresponding to the operation mode selected by said selection means; and an APC section for reducing fluctuation in a light emission amount of the light emitting element relative to change in ambient temperature of the LED, the APC section comprising a monitor light receiving element for receiving light from the light emitting element to monitor the light emitting element, wherein the APC section controls a drive current of the emitting element based on an electric signal corresponding to a light reception amount provided from the monitor light receiving element.

* * * * *

UNITED STATES PATENT AND TRADEMARK OFFICE
CERTIFICATE OF CORRECTION

PATENT NO. : 6,891,142 B2
DATED : May 10, 2005
INVENTOR(S) : Yuji Ogawa

It is certified that error appears in the above-identified patent and that said Letters Patent is hereby corrected as shown below:

Column 15,
Line 63, "abase" shoould read -- a base --.

Column 17,
Line 12, "form" should read -- from --.

Signed and Sealed this

Sixteenth Day of August, 2005

JON W. DUDAS
*Director of the United States Patent and Trademark Office*